June 20, 1933.  H. J. COOK  1,915,245
FASTENING MEANS FOR BIT BRACE CHUCKS
Filed Jan. 8, 1932
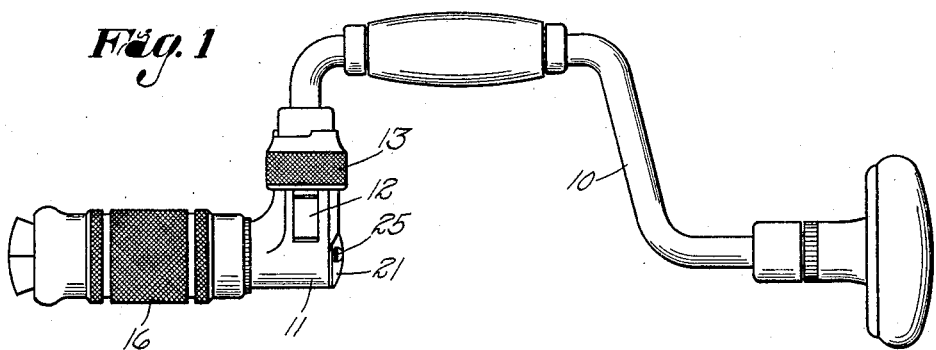
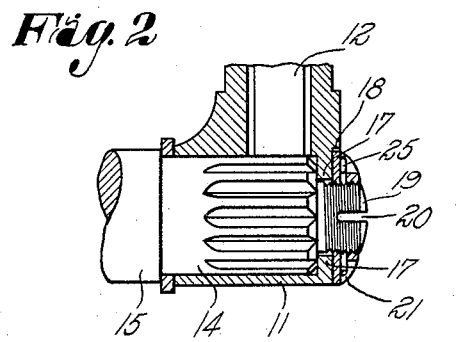
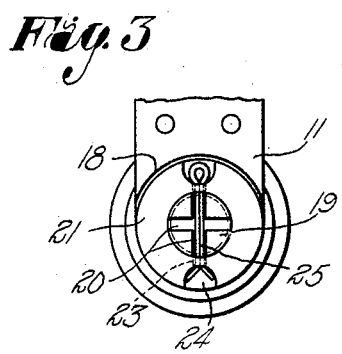
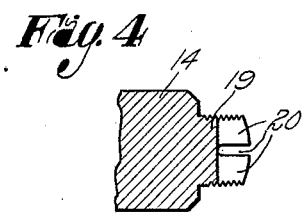
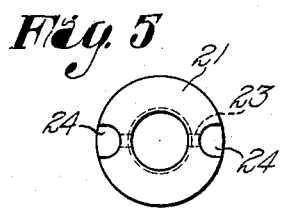
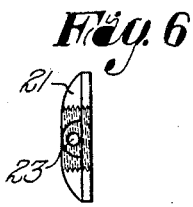
Inventor
Harris J. Cook
By
Attorney Patented June 20, 1933

1,915,245

UNITED STATES PATENT OFFICE

HARRIS J. COOK, OF NEW BRITAIN, CONNECTICUT, ASSIGNOR TO THE STANLEY WORKS, OF NEW BRITAIN, CONNECTICUT, A CORPORATION OF CONNECTICUT

FASTENING MEANS FOR BIT BRACE CHUCKS

Application filed January 8, 1932. Serial No. 585,427.

The present invention relates to bit braces of the ratchet type wherein the core carrying the ratchet wheel is adapted to turn in the ratchet end or sleeve of the brace, and the present invention has to do with an improved connection between the core and the ratchet end of the brace for insuring a tight, permanent, and easily assembled and accurate fit between them.

In the old type of ratchet bit brace, the rear end of the core of the chuck was provided simply with a threaded hole for receiving a screw therein, and the screw was provided with a relatively large head which in itself provided a bearing on the outer portion of the ratchet end or sleeve. The chief difficulty encountered with this prior construction is in the assembling of the parts, as it is necessary to have the screw end fit closely in the end of the sleeve or ratchet end and this necessitates varying thicknesses of washers which are placed beneath the screw head to insure the proper tight fit. This naturally slows up the assemblage of the brace because very frequently the washers have to be removed or interchanged with thicker or thinner washers to obtain the necessary tight fit, and further, after the brace has been purchased, it is difficult for the owner to take up any wear or make adjustments unless he is equipped with the right size of washer.

A further difficulty which has been found in the use of these prior structures is that the screw, when in use, tends to loosen, incident to the frictional engagement of the head of the screw against the sleeve or ratchet end of the brace, and the screw frequently comes out and requires constant attention and tightening.

It is, therefore, the purpose of the present invention to provide an improved construction which effects a positive interlock between the ratchet end of the brace and the core of the bit receiving chuck, and also to provide an improved connection wherein the proper adjustments may be made with or without washers and, if washers are used, the same may be of uniform thickness. Further, the structure of the present invention is adapted to admit of quick and easy taking up of wear or other lost motion which may occur by the use and handling of the brace.

A still further object of the invention is to provide a construction accomplishing the above results and which does not materially change the structure or general features of the brace, and which is economical from the standpoint of manufacture and assemblage, and a structure which does not provide any disadvantageous projections or formations on the parts of the brace.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown one embodiment which the present invention may take:

Fig. 1 is a side elevation of a ratchet bit brace constructed according to the present invention;

Fig. 2 is a detail enlarged section taken through the ratchet wheel end of the core and the body of the brace, showing the improved connection in place;

Fig. 3 is a rear end view of the same;

Fig. 4 is a detail fragmentary sectional view of the core end, showing the threaded stud with the intersecting transverse slots therein;

Fig. 5 is a rear face view of the adjusting nut employed; and

Fig. 6 is an edge view of the same.

Referring now to the drawing, the present invention is particularly applicable to bit braces of the type having a body portion or handle 10 of crank formation, and which is provided at one end thereof with a sleeve or bearing portion 11 arranged co-axially with the body of the brace 10 and which carries the usual pawls or dogs 12 controlled by a reversing collar 13.

As shown to advantage in Fig. 2, this sleeve 11 provides a bearing and support for the ratchet wheel end 14 of a core member 15 upon the front end of which is mounted the elements of a chuck 16.

In order to hold the ratchet end 14 of the core in the bearing sleeve 11, the latter is provided at its rear end with an annular shoulder 17 against which the ratchet portion 14 abuts, the shoulder 17 determining the proper register of the ratchet wheel end of the core 14 with the dogs or pawls 12.

As is usual, the rear end of the bearing sleeve 11 may be provided with a depression or recess 18 for receiving the fastening or retaining device used for holding the core and its ratchet wheel end 14 to the sleeve 11.

According to the present invention, the rear end of the ratchet wheel portion 14, as best shown in Fig. 4, is provided with a short stud 19 having relatively fine external threads, such as twenty-seven threads to the inch, and these threads extend out to the extremity of the stud 19. The stud 19 is also provided with one or more transverse slots 20 which extend axially into the stud 19 to an appreciable extent, and the extremity of the stud 19 may be rounded off, as shown, so as to provide a smooth deflecting face for the stud to prevent engagement thereof with the hands and surrounding objects.

Mounted in threaded relation upon the stud 19 is a relatively flat nut 21 which has internal threads corresponding to those on the stud 19, and which preferably has an outer rounded face adapted to conform, at least to some extent, with the rounded end of the stud 19 so as to provide therewith a continuous rounded smooth surface without projections or shoulders. This nut 21 is of greater exterior diameter than the shoulder 17 and may be proportioned to lie within the recess 18 of the bearing 11. If desired, a spacing washer may be employed between the nut 21 and the shoulder 17, but this washer is not essential according to the present construction, and the thickness of the washer is immaterial as adjustment is taken up by the nut 21 rather than by the axial screw as heretofore used.

As shown to advantage in Figs. 5 and 6, the nut 21 is provided with at least one transverse opening or passage 23 the ends of which are flared outwardly into recesses 24 which open through the outer rounded or curved face of the nut. The inner face of the nut is flat so as to engage in surface contact throughout its extent with the washer, or the adjacent portion of the bearing sleeve 11.

The transverse opening 23 in the nut 21 is adapted to register with a selected slot 20 by turning the nut 21, and when the slot and the opening are in register, they are adapted to receive therethrough a cotter pin 25 or the like. The recesses 24 accommodate the head and the spread ends of the cotter pin 25, as shown in Fig. 3, so that the cotter pin may lie beneath the general surface of the nut 21.

In assembling a brace constructed according to this invention, it is only necessary to insert the ratchet wheel portion 14 in the sleeve 11, and then place the nut 21 on the outer end of the stud 19 and turn the nut 21 up against the adjacent end of the bearing 11. Owing to the provision of the relatively fine threads upon the stud 19, the nut 21 may be fitted with a fine or minute adjustment against the rear end of the sleeve 11 so as to easily take up any slight irregularities or inaccuracies which may occur in the manufacture of the bearing sleeve 11 and the end of the ratchet wheel portion 14 of the chuck core. This relatively fine threaded arrangement also admits of the turning of the nut 21 through a fraction of a turn, such as through one-fourth of a revolution, in order to bring the opening 23 in the nut into register with one of the slots 20 of the stud. The cotter pin 25 is now inserted through the opening 23 and the adjacent slot 20. The free ends of the cotter pin are spread to lock the cotter pin in place, and it will be noted from Fig. 2 that the head and the spread ends of the cotter pin lie within the body of the nut and thus a smooth and rounded finish or end is given to the coupling.

It is also apparent that after the brace has been positioned and used so that there is a slight wear or play between the nut 21 and the shoulder 17, or between the shoulder 17 and the adjacent end of the ratchet wheel portion 14, this loose play may be quickly and easily taken up by the owner by merely withdrawing the cotter pin 25 and turning the nut 21 up on the stud 19 to the desired extent, and then replacing the cotter pin. No additional washers are required to effect this adjustment or taking up of the loose play, and the nut and the cotter pin may be repeatedly adjusted during the life of the tool.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a brace bit, a brace body having a bearing sleeve with a reduced rear end, a chuck core having a ratchet wheel end rotatable mounted in said sleeve bearing and against the reduced end thereof and provided with an axial stud projecting through the reduced inner end of the bearing sleeve, said stud having relatively fine exterior threads thereon and provided with a transverse slot opening through its outer end and through the threaded portion of the stud, a nut correspondingly threaded and mounted on said stud and bearing against the reduced rear end of said bearing sleeve to hold said ratchet wheel end therein, said nut and stud having rounded exterior surfaces merging into the adjacent end of said bearing sleeve and said nut having a transverse opening therethrough adapted to register with the slot in said stud and having depressions in said curved face at opposite ends of said opening, and a cotter pin extending through said opening in the nut and said slot in the stud with the head and spread ends of the cotter pin lying in said depressions.

2. In a bit brace, a brace body having a bearing sleeve on one end, a chuck having a core with a ratchet wheel end rotatably mounted in the bearing sleeve and having a threaded stud on its rear end projecting through said bearing sleeve, a nut mounted on said stud and engaging the rear end of said bearing sleeve to hold the ratchet wheel end of said core in the sleeve, said stud having a transverse slot therein and said nut having a transverse opening therethrough adapted to register with the slot in the stud, said nut also having depressions in its outer face at opposite ends of said opening, and a cotter pin extending through the opening in the nut and the slot in the stud with the head and spread ends of the cotter pin lying in said depressions.

3. In a bit brace, a brace body having a bearing sleeve on one end, a chuck having a core with a ratchet wheel end rotatably mounted in the bearing sleeve and having a threaded stud on its rear end projecting through said bearing sleeve, a nut mounted on said stud and engaging the rear end of said bearing sleeve to hold the ratchet wheel end of said core in the sleeve, and means disposed entirely within the confines of the stud and nut for locking said nut from turning on the stud.

HARRIS J. COOK.